(12) United States Patent
Khosravi et al.

(10) Patent No.: US 6,184,926 B1
(45) Date of Patent: Feb. 6, 2001

(54) SYSTEM AND METHOD FOR DETECTING A HUMAN FACE IN UNCONTROLLED ENVIRONMENTS

(75) Inventors: Mehdi Khosravi, Roswell; Ara V. Nefian, Atlanta, both of GA (US)

(73) Assignee: NCR Corporation, Dayton, OH (US)

( * ) Notice: Under 35 U.S.C. 154(b), the term of this patent shall be extended for 0 days.

(21) Appl. No.: 08/859,902

(22) Filed: May 21, 1997

Related U.S. Application Data (60) Provisional application No. 60/031,816, filed on Nov. 26, 1996.

(51) Int. Cl.[7] .................................................. H04N 5/262
(52) U.S. Cl. ........................ 348/239; 382/190; 382/118; 348/15
(58) Field of Search ................................... 348/239, 222, 348/15; 382/171, 190, 295, 117, 118

(56) References Cited

U.S. PATENT DOCUMENTS

| 5,150,432 | * | 9/1992 | Ueno et al. ........................... 382/56 |
| 5,164,992 | * | 11/1992 | Turk et al. ............................. 382/36 |
| 5,497,430 | * | 3/1996 | Sadovnik et al. ................... 382/118 |
| 5,689,575 | * | 11/1997 | Sako et al. ........................... 382/118 |
| 5,781,650 | * | 7/1998 | Lobo et al. ........................... 382/118 |
| 5,859,921 | * | 1/1999 | Suzuki .................................. 382/118 |
| 5,878,156 | * | 3/1999 | Okumura ............................. 382/118 |
| 5,901,244 | * | 5/1999 | Souma et al. ........................ 382/118 |
| 5,905,807 | * | 5/1999 | Kado et al. .......................... 382/118 |
| 5,933,527 | * | 8/1999 | Ishikawa .............................. 382/118 |

OTHER PUBLICATIONS

Proceedings of the 13th International Conference on Pattern Recognition, etc., *Face Detection and Facial Feature Extraction Using Color, Shape and Symmetry-Based Cost Functions*, Saber et al., 1996, pp. 654, 658.

Proceedings of the International Conference on Image Processing, *Face Localization and Facial Feature Extraction Based on Shape and Color Information*, Sobottka et al., 1996, pp. 483–486.

IBM Technical Disclosure Bulletin, *Method for Extracting Facial Features by Using Color Information*, Oct. 1, 1995, vol. 38, No. 10, pp. 163–165.

* cited by examiner

*Primary Examiner*—Tuan Ho
*Assistant Examiner*—Jacqueline Wilson
(74) *Attorney, Agent, or Firm*—Needle & Rosenberg, P.C.

(57) ABSTRACT

The present invention provides for the detection of human heads, faces and eyes in real-time and in uncontrolled environments. The present invention may be implemented with commercially available components, such as a standard video camera and a frame grabber, on a personal computer (PC) platform. The approach used by the present invention is based on a probabilistic framework that uses a deformable template model to describe the human face. The present invention works both with simple head-and-shoulder video sequences, as well as with complex video scenes with multiple people and random motion. The present invention is able to locate the eyes from different head poses (rotations in image plane as well as in depth). The information provided by the location of the eyes may be used to extract faces from a frontal pose in a video sequence. The extracted frontal frames can be passed to recognition and classification systems (or the like) for further processing.

8 Claims, 12 Drawing Sheets

ELLIPSE MODEL = (x0, y0, a, b), b = Ma, M = 1.4
h - b/6

SYSTEM AND METHOD FOR DETECTING A HUMAN FACE IN UNCONTROLLED ENVIRONMENTS

CROSS-REFERENCE TO RELATED PATENT APPLICATIONS

This patent application is a continuation-in-part of co-pending U.S. Provisional Patent Application Ser. No. 60/031,816, entitled "Real-Time Detection of Human Faces in Uncontrolled Environments", filed Nov. 26, 1996.

BACKGROUND OF THE INVENTION

1. Field of the Invention

The present invention generally relates to real-time video image analysis, and more specifically to the detection of human faces and eyes within real-time video images.

2. Description of the Prior Art

In recent years, the detection of human faces from video data has become a popular research topic. There are numerous commercial applications of face detection, such as in face recognition, verification, classification, identification as well as security access and multimedia. To extract the human face in an uncontrolled environment, most prior art techniques attempt to overcome the difficulty of dealing with issues such as variations in lighting, variations in pose, occlusion of people by other people, and cluttered or non-uniform backgrounds.

In one prior art face detection technique, an example-based learning approach for locating unoccluded human frontal faces is used. The approach measures a distance between the local image and a few view-based "face" and "non face" pattern prototypes at each image location to locate the face. In another technique, the distance to a "face space", defined by "eigenfaces", is used to locate and track frontal human faces. In yet another prior art technique, human faces are detected by searching for significant facial features at each location in the image. Finally, in other techniques, a deformable template based approach is used to detect faces and to extract facial features.

In addition to the detection of faces within video image sequences, prior art systems have attempted to detect eyes on human heads. For example, Challepa et al., "Human and Machine Recognition of Faces: A Survey", *Proceedings of the IEEE*, vol. 83, no. 5, pp. 705–740, May 1995, described a process for detecting eyes on a human head, where the video image includes a front view of the head. For frontal views, eye detection that is based on geometrical measures has been extensively studied, by, for example, Stringa, "Eyes Detection for Face Recognition", *Applied Artificial Intelligence*, vol. 7, no. 4, pp. 365–382, October–December 1993 and Brunelli et al., "Face Recognition: Features versus Templates", *IEEE Transaction on Pattern Analysis and Machine Intelligence*, October 1993. Additionally, Yuilee et al., "Feature Extraction from Faces Using Deformable Templates", *International Journal of Computer Vision*, vol. 8, pp. 299–311, 1992, describe a deformable template-based approach to facial feature detection. However, these methods may lead to significant problems in the analysis of profile or back views. Moreover, the underlying assumption of dealing only with frontal faces is simply not valid for real-world applications.

There is therefore a significant need in the art for a system that can quickly, reliably and flexibly detect the existence of a face or faces within a video image, and that can also extract various features of each face, such as eyes.

SUMMARY OF THE INVENTION

The present invention provides for the detection of human heads, faces and eyes in real-time and in uncontrolled environments. The present invention may be implemented with commercially available components, such as a standard video camera and a frame grabber, on a personal computer (PC) platform. The approach used by the present invention is based on a probabilistic framework that uses a deformable template model to describe the human face. The present invention works both with simple head-and-shoulder video sequences, as well as with complex video scenes with multiple people and random motion. The present invention is able to locate the eyes from different head poses (rotations in image plane as well as in depth). The information provided by the location of the eyes may be used to extract faces from a frontal pose in a video sequence. The extracted frontal frames can be passed to recognition and classification systems (or the like) for further processing.

DETAILED DESCRIPTION OF THE INVENTION

A preferred embodiment of the invention is now described in detail. Referring to the drawings, like reference numerals indicate like components and/or steps throughout the views.

1. The Video System

Figure 1:
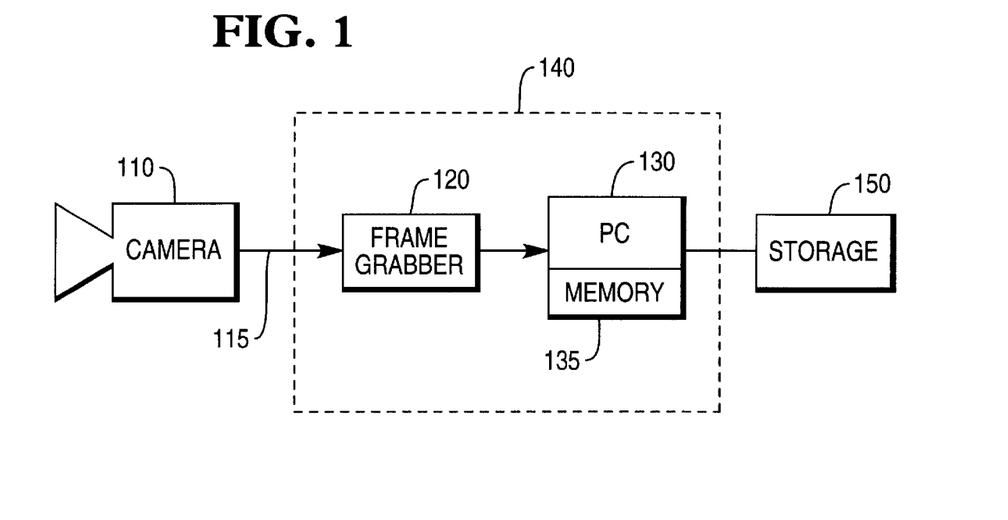
FIG. 1 is a block diagram of the present invention.

FIG. 1 depicts the overall structure of the present invention in one embodiment. The hardware components of the present invention may consist of standard off-the-shelf components. The primary components in the system are one or more video cameras 110, one or more frame grabbers 120, and a processing system 130, such as a personal computer (PC). The combination of the PC 130 and frame grabber 120 may collectively be referred to as a "video processor" 140. The video processor 140 receives a standard video signal format 115, such as RS-170, NTSC, CCIR, PAL, from one or more of the cameras 110, which can be monochrome or color. In a preferred embodiment, the camera(s) 110 may be mounted or positioned to view a selected area of interest, such as within a retail establishment or other suitable location.

The video signal 115 is input to the frame grabber 120. In one embodiment, the frame grabber 120 may comprise a Meteor Color Frame Grabber, available from Matrox. The frame grabber 120 operates to convert the analog video signal 115 into a digital image stored within the memory 135, which can be processed by the video processor 140. For example, in one implementation, the frame grabber 120 may convert the video signal 115 into a 640×480 (NTSC) or 768×576 (PAL) color image. The color image may consist of three color planes, commonly referred to as YUV or YIQ. Each pixel in a color plane may have 8 bits of resolution, which is sufficient for most purposes. Of course, a variety of other digital image formats and resolutions may be used as well, as will be recognized by one of ordinary skill.

As representations of the stream of digital images from the camera(s) 110 are sequentially stored in memory 135, analysis of the video image may begin. All analysis according to the teachings of the present invention may be performed by the processing system 130, but may also be performed by any other suitable means. Such analysis is described in further detail below.

2. Overall Process Performed by the Invention

Figure 2:
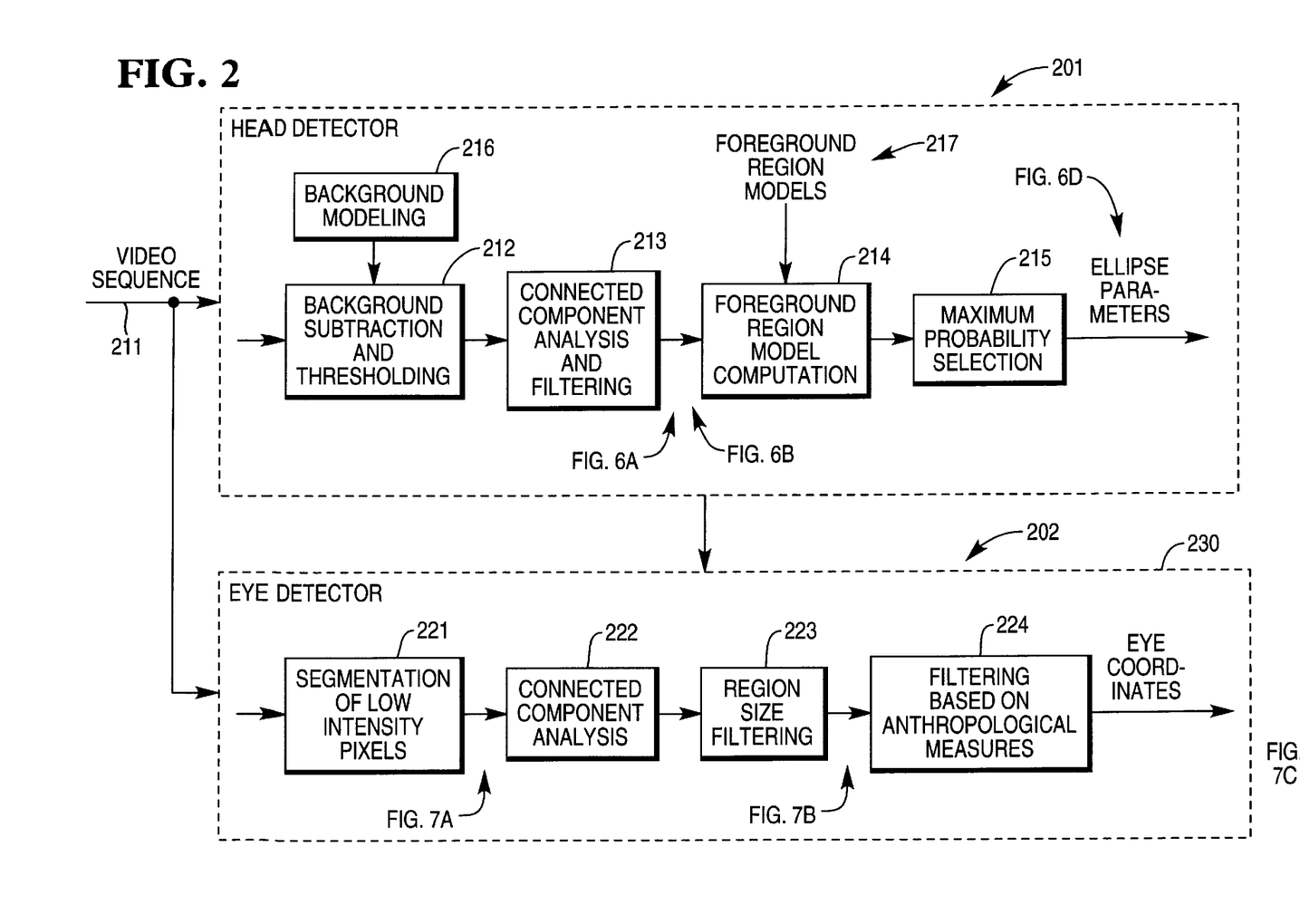
FIG. 2 is a flow diagram depicting the overall operation of the present invention.

An overall flow diagram depicting the process performed by the processing system 130 of the present invention is shown in FIG. 2. The first overall stage 201 performed by the processing system 130 is the detection of one or more human heads (or equivalent) within the video image from camera 110, which is stored in memory 135, and the second overall stage 202 is the detection of any eyes associated with the detected human head(s). The output 230 of stages 201–202 may be passed to recognition and classification systems (or the like) for further processing.

The steps performed in stage 201 are described below.

Figure 6A:
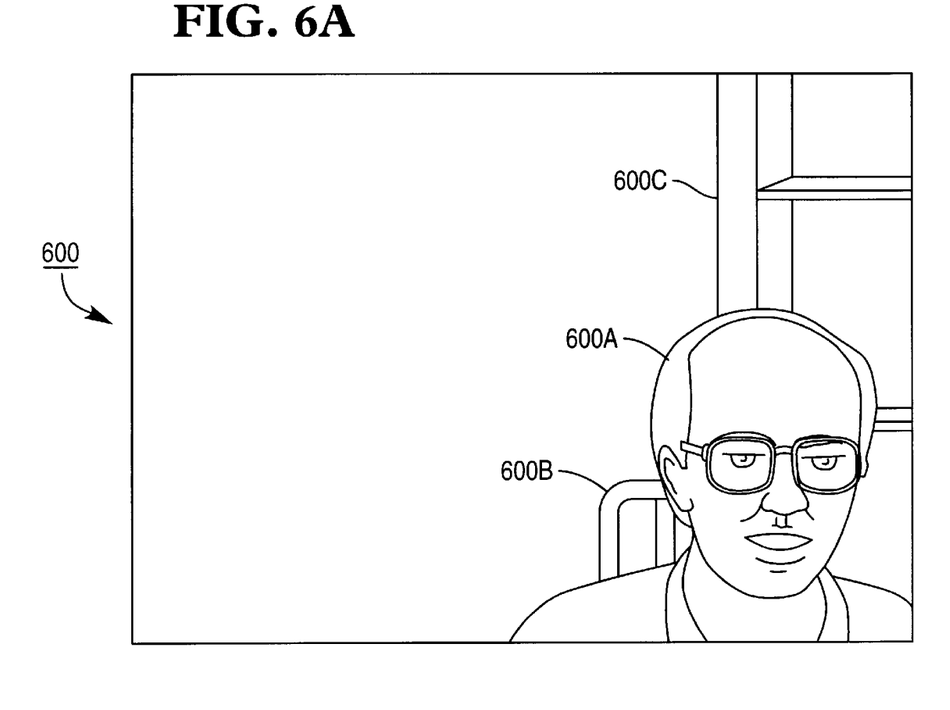
FIGS. 6A–6D, 7A–7C, 8A–8D and 9A–9D depict examples of video images that may be processed by the present invention.
Figure 6B:
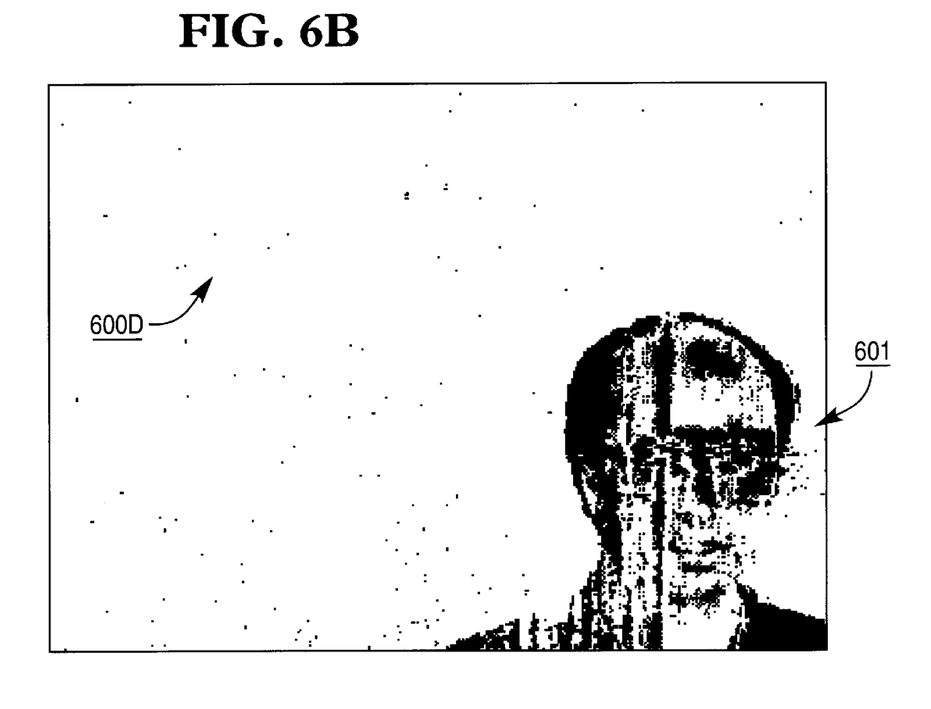
Figure 6C:
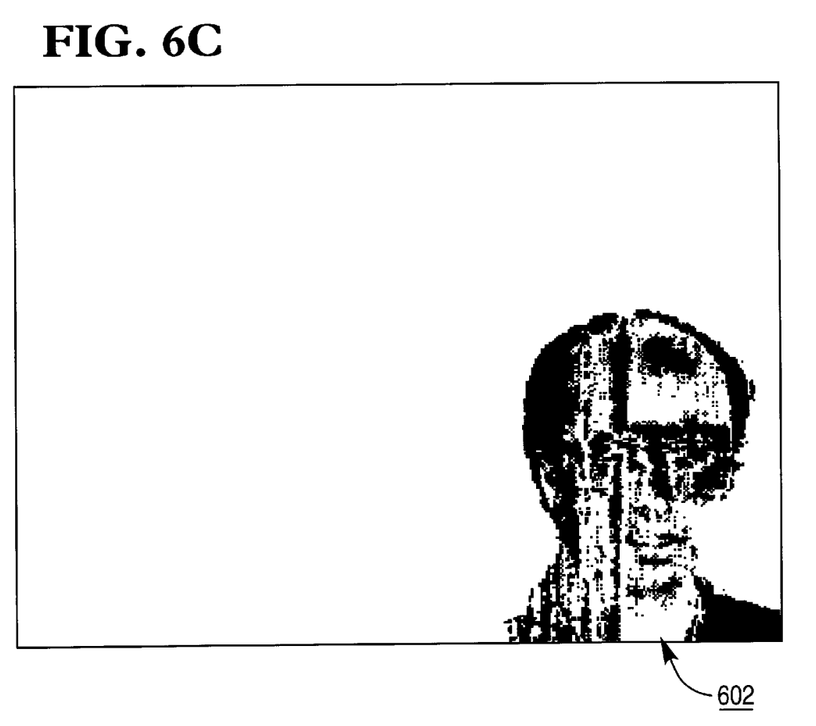

The first steps 212–213 and 216 (of the head detection stage 201) is the segmentation of people in the foreground regions of the sequence of video images stored in memory 135 over time, which is represented in FIG. 2 as video sequence 211. Such segmentation is accomplished by background modeling (step 216), background subtraction and thresholding (step 212) and connected component analysis (step 213). Assuming the original image 600 of FIG. 6A (which may be stored in memory 135, etc.), as shown in FIG. 6B, the result of steps 212 and 213 is a set of connected regions (blobs) (e.g., blobs 601) which have large deviations from the background image. The connected components 601 are then filtered also in step 213 to remove insignificant blobs due to shadow, noise and lighting variations, resulting in, for example, the blobs 602 in FIG. 6C.

Figure 6D:
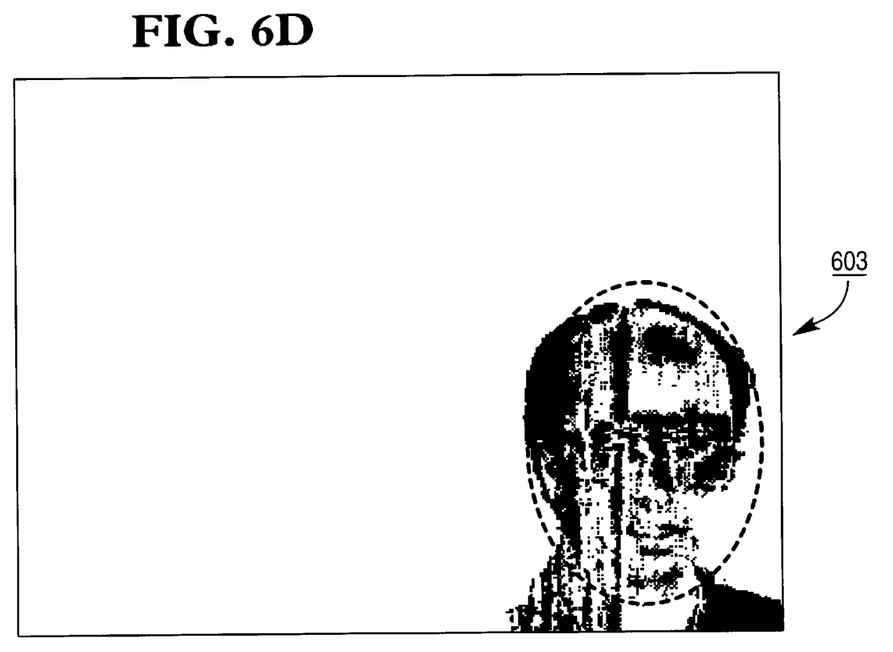

To detect the head of people whose bodies are occluded, a model-based approach is used (steps 214–215, 217). In this approach, different foreground models (step 217) may be used for the case where there is one person in a foreground region and the case where there are two people in a foreground region. The output of step 214 are the probabilities of the input given each of the foreground region models. Step 215 selects the model that best describes the foreground region by selecting the maximum probability computed in step 214. An example output of step 215 is shown in FIG. 6D, wherein the ellipse 603 is generated.

Figure 9A:
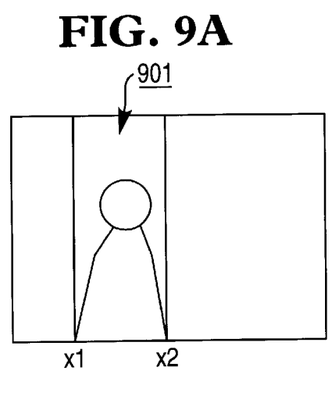
Figure 9B:
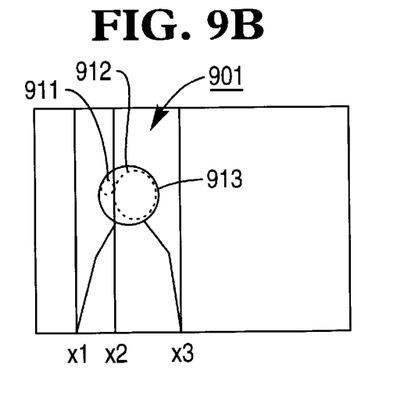

The functionality performed by system 130 of steps 214–215 and 217 is illustrated in FIGS. 9A–9D. Each of FIGS. 9A–9D represent a video image that may be created by frame grabber 120 and stored in memory 135 (FIG. 1). FIG. 9A depicts an example foreground region representing one person 901. The one person model (x1, x2) matches the input data. FIG. 9B depicts the same foreground region modeled as two persons (x1, x2, x3). In this case two dashed ellipses 911, 912 are fitted but they do not represent the correct location of the head 913. The probability of the foreground region is computed for each model as is described later and the system automatically selects the model for one person to best describe the foreground region in this case.

Figure 9C:
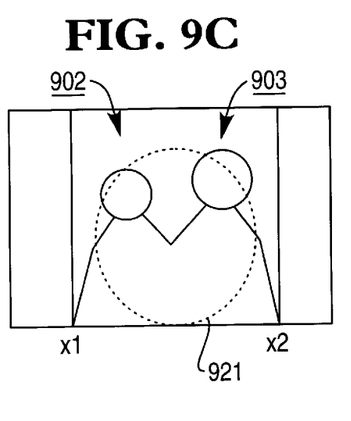
Figure 9D:
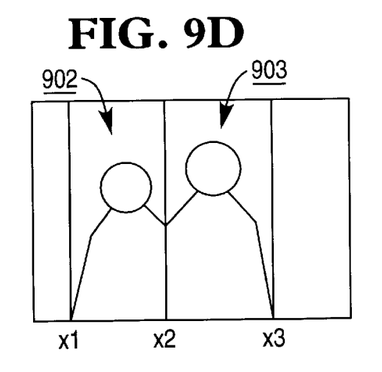

FIGS. 9C and 9D depict an example foreground region with two people 902, 903 with occluded bodies. In this case, the system 130 of the present invention selects the two people model (x1, x2, x3) to best represent the data. When a single person model is used to describe the foreground region, the large dashed ellipse 921 is fitted which does not correspond to any of the people's 902, 903 heads. The system does not select the single person model because the probability of one person model for the given input data is lower than the probability of the two person model given the input data.

The next overall stage 202 in the present invention is the detection of eyes from varying poses and the extraction of those faces that correspond to frontal views. In prior art articles, such as those described by Turk et al., "Face Recognition Using Eigenfaces", *Proceedings on International Conference on Pattern Recognition,* 1991 and Brunelli et al., "Face Recognition: Features versus Templates", *IEEE Transactions on Pattern Analysis and Machine Intelligence,* vol. 15, no. 10, October 1993, techniques have been proposed whereby eyes are detected from frontal views. However, the assumption of frontal view faces is not valid for real world applications.

In the present invention, in steps 221–222 the most significant face features are detected by analyzing the connected regions of large deviations from facial statistics. Region size and anthropological measure-based filtering detect the eyes and the frontal faces. Eye detection based upon anthropological measures for frontal views has been studied in the prior art (see, e.g., Brunelli et al., cited previously). However, such methods can run into problems in the analysis of profile or back views of faces. In step 223, filtering based on detected region size is able to remove big connected components corresponding to hair as well as small regions generated by noise or shadow effects. In step 224, the remaining components are filtered considering the anthropological features of human eyes for frontal views, and again the output 230 may be passed to another system for further processing. The eye detection stage 202 of the present invention is described in further detail below.

3. Segmentation of Foreground Regions

To extract moving objects within the video image stored in memory 135, the background may be modeled as a texture with the intensity of each point modeled by a Gaussian distribution with mean $\mu$ and variance $\sigma$, $N_b(\mu,\sigma)$ (step 216). The pixels in the image are classified as foreground if $p(O(x,y)|N_b(\mu,\sigma)) \leq T$ and as background if $p(O(x,y)|N_b(\mu,\sigma)) > T$. The observation $O(x,y)$ represents the intensity of the pixels at location (x,y), and T is a constant (step 212).

The connectivity analysis (step 213) of the "foreground" pixels generates connected sets of pixels, i.e. sets of pixels that are adjacent or touching. Each of the above sets of pixels describe a foreground region. Small foreground regions are assumed to be due to shadow, camera noise and lighting variations and are removed.

4. The Foreground Region Modeling System

The foreground regions are analyzed in further detail in steps 214–215 and 217 to detect the head. It is known that if there is only one head in the image, then it may be detected by finding the upper region in each set of connected foreground regions. However, this technique fails when people in an image are occluded by other people. In this case, a foreground region may correspond to two or more people, and finding the regions corresponding to heads requires a more complicated approach. In the case of partial people occlusion, in which bodies are occluded by other bodies, but heads are not occluded, special processing must be performed.

Figure 3:
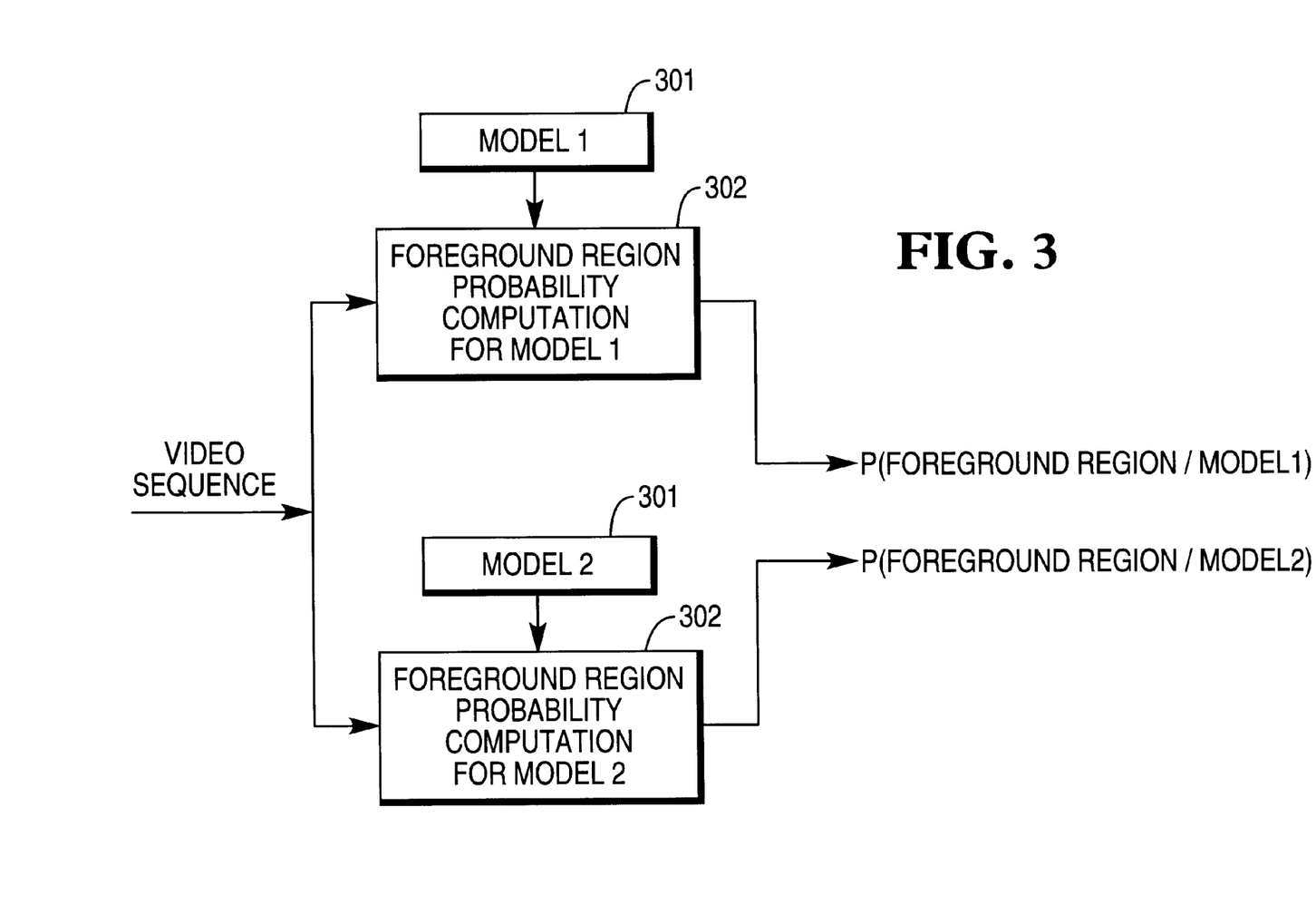
FIG. 3 is a flow diagram depicting a process for choosing the most likely model of people within the video image.

To determine the head positions in this case, the number of people in each foreground region must be determined. As shown in FIG. 3, in order to determine the number of people within the video image, N separate models $\lambda_i$ (301), (where i may equal 1 to N) may be built, each model $\lambda_i$ 301 corresponding to i people in a set of connected foreground region. Based on the assumption that faces are vertical and are not occluded, the model parameters for model $\lambda_i$ are $(x_0, x_1, \ldots x_i)$ where i is the number of people and $x_k$ (where k=1 to i) specifies the horizontal coordinates of the vertical boundaries that separate the i head region in model $\lambda_i$. The approach used to determine the number of people in each foreground region is to select in step 215 the model $\lambda_i$ 301 for which the maximum likelihood is achieved:

$$\lambda = \arg\max_{i \in [1,N]} P(O(x,y)|\lambda_i) \quad (1)$$

where the observations $O(x,y)$ are the pixel intensities at coordinates $(x,y)$ in the foreground regions and $P(O(x,y)|\lambda_i)$ is the likelihood functions for the $i^{th}$ model 301.

The probability computation steps 302 in FIG. 3 determines the likelihood functions for each model 301. In step 215, the observations $O(x,y)$ in the foreground regions are used to find for each model $\lambda_i$ 301 the optimal set of parameters $(x_0, x_1, \ldots x_i)$ that maximize $P(O(x,y)|\lambda_i)$, i.e. to find the parameters $(x_0, x_1, \ldots x_1)$ that "best" segment the foreground regions (step 215). It will be shown later that the computation of $P(O(x,y)|\lambda_i)$ for each set of model parameters 301 requires an efficient head detection algorithm inside each rectangular window bordered by $x_{j-1}$ and $x_j$, j=1, ..., i.

It is common to approximate the support of the human face by an ellipse. In addition, it has been determined that the ellipse aspect ratio of the human face is, for many situations, invariant to rotations in the image plane as well as rotations in depth. Based on the above, the head model 301 is parameterized by the set $(x_0, y_0, a, b)$, where $x_0$ and $y_0$ are the coordinates of the ellipse centroid and a and b are the axis of the ellipse. The set $(x_0, y_0, a, b)$ is determined through an efficient ellipse fitting process described elsewhere with respect to FIG. 5.

5. Computation of Foreground Model Likelihood Functions

Based on the assumption that human faces are vertical and are not occluded, it is deemed appropriate to parameterize models $\lambda_i$ 301 over the set of parameters $(x_0, x_1, \ldots x_i)$ which are the horizontal coordinates of the vertical borders that separate individual faces in each foreground region. The set of parameters $(x_0, x_1, \ldots x_i)$ is computed iteratively to maximize $P(O(x,y)|\lambda_i)$. In a Hidden Markov Model (HMM) implementation (described further in Rabiner et al., "A Tutorial on Hidden Markov Models and Selected Applications in Speech Recognition", *Proceedings of the IEEE*, February 1989), this corresponds to the training phase in which the model parameters are optimized to best describe the observed data.

To define the likelihood functions $P(O(x,y)|\lambda_i)$ a preliminary discussion about the head detection process algorithm may be helpful. In the present invention, the head is determined by fitting an ellipse around the upper portions of the foreground regions inside each area bounded by $x_{j-1}, x_j$ j=1, ..., i. The head detection problem is reduced to finding the set of parameters $(x_0, y_0, a, b)$ that describe an ellipse type deformable template (step 402 in FIG. 4). Parameters $x_0$ and $y_0$ describe the ellipse centroid coordinates and a and b are the ellipse axis. The ellipse fitting algorithm is described in more detail with respect to FIG. 5.

Figure 4:
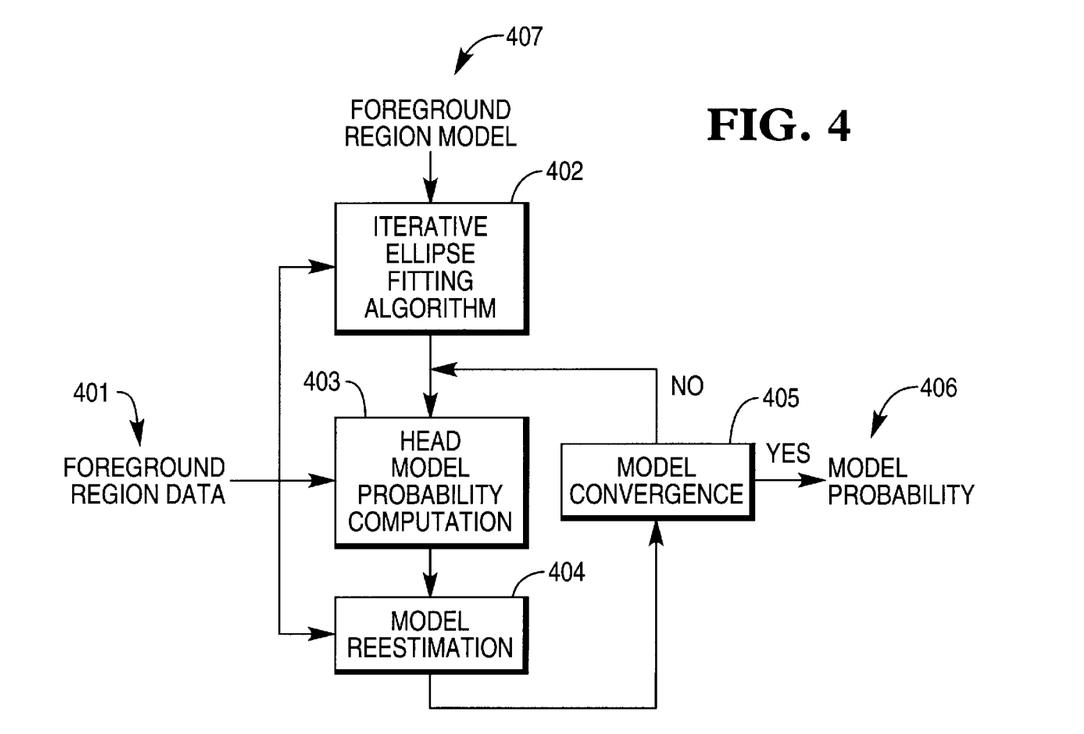
FIG. 4 is a flow diagram further depicting the modeling process of FIG. 3.
Figure 10:
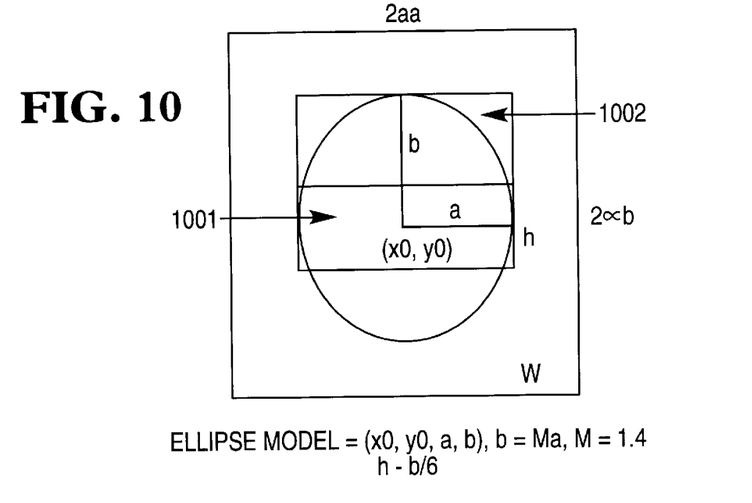
FIG. 10 depicts criteria that may be used to model a face within a video image.

For each set of parameters $(x_0, y_0, a, b)$ a rectangular template (W in FIG. 10) is defined by the set of parameters $(x_0, y_0, \alpha a, \alpha b)$, where $x_0$ and $y_0$ are the coordinates of the center of the rectangle and $\alpha a, \alpha b$ are the width and length of the rectangle, and $\alpha$ is some constant (see FIG. 10). In each area bounded by $x_{j-1}, x_j$, $R_{out,j}$ is the set of pixels outside the ellipse template and inside the rectangle template and $R_{in,j}$ is the set of pixels inside the ellipse template (FIG. 10). The regions $R_{in,j}$ and $R_{out,j}$ locally classify the image in "face" and "non face" regions. Based on the above discussion, the likelihood function $P(O(x,y)|\lambda_i)$ for the model $\lambda_i$ is determined by the ratio of the number of foreground pixels classified as "face" and background pixels classified as "non face" in each area bounded by $x_{j-1}, x_j$, (where j=1 to i), over the total number of pixels in "face" and "non face" regions (step 403). This is described in Equation (2) below:

$$P(O(x,y)|\lambda_i) = \frac{\sum_{j=1}^{i}\left(\sum_{(x,y)\in R_{in,j}} f(x,y) + \sum_{(x,y)\in R_{out,j}} b(x,y)\right)}{\sum_{j=1}^{i}\left(\sum_{(x,y)\in R_{in,j}}(b(x,y)+f(x,y)) + \sum_{(x,y)\in R_{out,j}}(f(x,y)+b(x,y))\right)} \quad (2)$$

where $b(x,y) = \begin{cases} 1, & \text{if } p(O(x,y)|N_b(\mu,\sigma)) > T \\ 0, & \text{otherwise} \end{cases} \quad (3)$ and $f(x,y) = \begin{cases} 1, & \text{if } p(O(x,y)|N_b(\mu,\sigma)) < T \\ 0, & \text{otherwise} \end{cases} \quad (4)$ The goal in steps 301–302 is not only to compute the likelihood functions $P(O(x,y)|\lambda_i)$ for a set of parameters $(x_0, x_1, \ldots x_i)$, but also to determine the set of parameters that maximize $P(O(x,y)|\lambda_i)$. The initial parameters $(x_0, x_1, \ldots x_i)$ for model $\lambda_i$ 301 are chosen to uniformly segment the data, i.e. $x_j - x_{j-1} = (x_i - x_0)/i$ (where j=1 to i). As described in FIG. 4, the parameters $(x_o, x_1, \ldots x_i)$ are iteratively adjusted to maximize $P(O(x,y)|\lambda_i)$ (step 404). The iterations are terminated if the difference of the likelihood functions in two consecutive iterations is smaller than a threshold (step 405).

Figure 11:
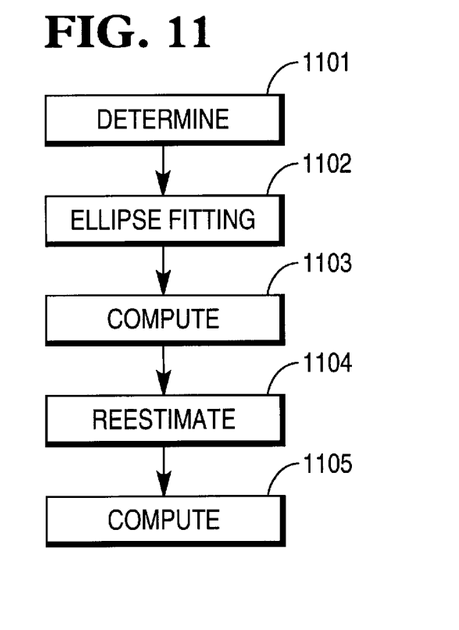
FIGS. 11–12 are flow diagrams depicting processes that are performed by the present invention.

In a two person model in one embodiment, $x_1$ is the only parameter that is iteratively adjusted for the estimation of the model. The computation of the likelihood function for a two person model is described in the following steps. The reference numerals within [brackets] correspond to like-numbered steps illustrated in FIG. 11:

[1101] the initial values of $(x_0, x_1, x_2)$ are determined such that $x_0$ is the x coordinate of the leftmost point of the foreground region, $x_2$ is the x coordinate of the rightmost point of the foreground region and $x_1 = (x_0 + x_2)/2$.

[1102] the ellipse fitting process (step 402 in FIG. 4) is performed in each of the two vertical slots bounded by $(x_0, x_1)$ and $(x_1, x_2)$ pairs. The ellipse fitting algorithm will be described in more detail later with respect to FIG. 5.

[1103] for the ellipses found, the following parameters are computed (step 403 in FIG. 4):

$$S_{in,j} = \frac{\sum_{(x,y) \in R_{in,j}} f(x,y)}{\sum_{(x,y) \in R_{in,j}} f(x,y) + b(x,y)} \qquad (4A)$$

$$S_{out,j} = \frac{\sum_{(x,y) \in R_{out,j}} b(x,y)}{\sum_{(x,y) \in R_{out,j}} f(x,y) + b(x,y)} \qquad (4B)$$

[1104] reesimate the value of $x_1$ according to the following formula:

$$x_1^{(k+1)} = x_1^{(k)} + \mu \cdot [(S_{in,0} - S_{out,0}) - (S_{in,1} - S_{out,1})] \qquad (4C)$$

where $\mu$ is a constant arround 20.

[1105] compute $P(O|\lambda_2)$ from Equation (2). If the difference between $P(O|\lambda_2)$ for consecutive values of parameter $x_1$ is smaller than a threshold, stop iterations. The parameters of the ellipses given by the ellipse fitting algorithm, performed in each slot bounded by $(x_0, x_1)$ and $(x_1, x_2)$, will determine the location and size of the people heads in the foreground region. If the difference between $P(O|\lambda_2)$ for consecutive values of parameter $x_1$ is bigger than the same threshold, then go to step 1102.

6. The Iterative Ellipse Fitting Algorithm

In step 402, the head within a video image is detected by iteratively fitting an ellipse around the upper portion of the foreground region inside the area bounded by $x_{j-1}, x_j$ (where j=1, . . . i). The objective in an ellipse fitting algorithm is to find the $x_0, y_0, a$ and b parameters of the ellipse such that:

$$((x-x_0)/a)^2 + ((y-y_0)/b)^2 = 1 \qquad (5)$$

A general prior art technique for fitting the ellipse around the detected blobs in step 402 (FIG. 4) is the use of the Hough Transform, described by Chellapa et al. in "Human and Machine Recognition of Faces: A Survey", *Proceedings of the IEEE,* vol. 83, no. 5, pp. 705–740, May 1993. However, the computational complexity of the Hough Transform approach, as well as the need for a robust edge detection algorithm, make it ineffective for real-time applications.

A better alternative for fitting the ellipse in step 402 (FIG. 4) is an inexpensive recursive technique that reduces the search for the ellipse parameters from a four dimensional space $x_0, y_0, a, b$ to a one dimensional space. The parameter space of the ellipse is reduced based on the following observations:

The width of the ellipse at iteration k+1 is equal to the distance between the right most and left most point of the blob at the line corresponding to the current centroid position, $y_0^{(k)}$ i.e.

$$a^{(k+1)} = f_1(y_0^{(k)}). \qquad (6)$$

where function $f_1$ is determined by the boundary of the objects resulting from the connected component analysis.

The centroid of the ellipse is located on the so-called "vertical skeleton" of the blob representing the person. The vertical skeleton is computed by taking the middle point between the left-most and the right-most points for each line of the blob. The $x_0^{(k+1)}$ coordinate of the centroid of the ellipse at iteration k+1 is located on the vertical skeleton at the line $y_0^{(k)}$ corresponding to the current centroid position. Hence $x_0^{(k+1)}$ will be uniquely determined as a function of $y_0^{(k)}$.

$$x_0^{(k+1)} = f_2(y_0^{(k)}), \qquad (7)$$

where function $f_2$ is a function determined by the vertical blob skeleton.

The b parameter of the ellipse (the length) is generally very difficult to obtain with high accuracy due to the difficulties in finding the chin line. However, generally the length to width ratio of the ellipse can be considered constant, such as M. Then, from Equation (6):

$$b^{(k+1)} = M \cdot a^{(k+1)} = M \cdot f_2(y_o^{(k)}) \qquad (8)$$

From Equation (5) we write:

$$y_o^{(k+1)} = F(x_0^{(k+1)}, a^{(k+1)}, b^{(k+1)}). \qquad (9)$$

Equations (6), (7), (8) and (9) lead to:

$$y_0^{(k+1)} = G(y_0^{(k)}), \qquad (10)$$

which describes the iterative ellipse-fitting process algorithm of the present invention. Equation (10) indicates that we have reduced the four-dimensional problem of finding the ellipse parameters to an implicit equation with one unknown $y_0$.

Figure 5:
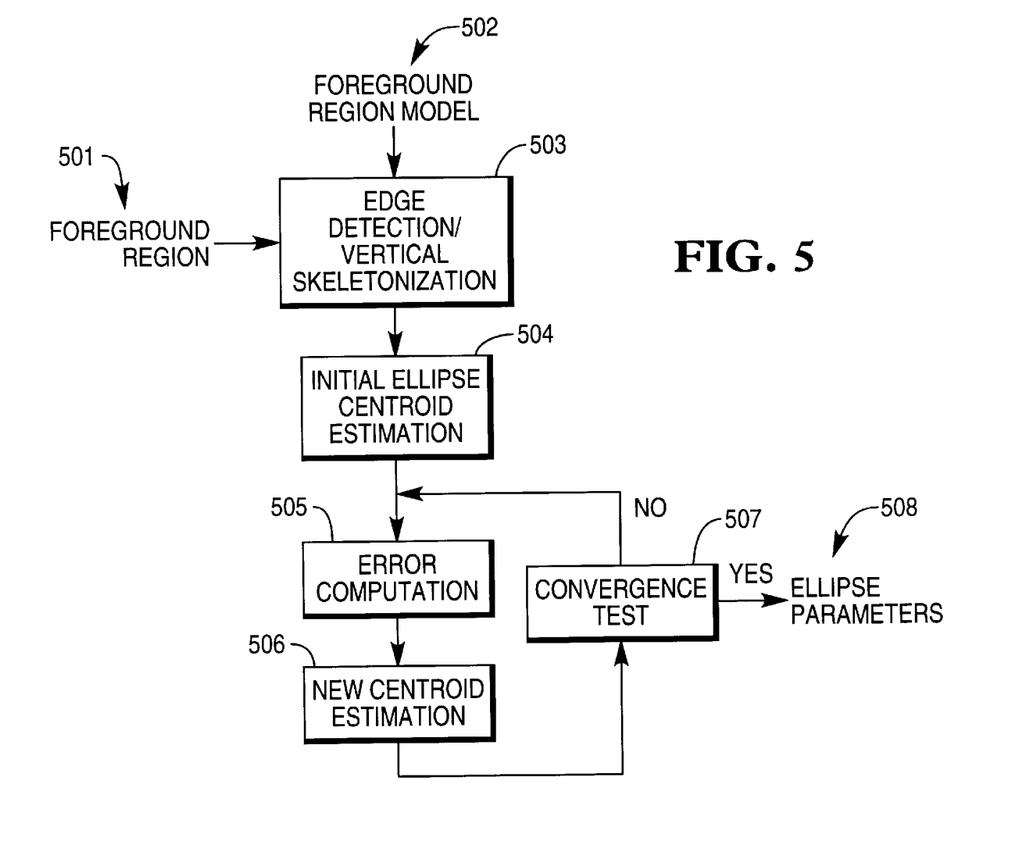
FIG. 5 is a flow diagram depicting a process for fitting an ellipse around the head of a person detected within a video image.

With this in mind, the ellipse fitting process is illustrated in further detail in FIG. 5. In step 503 the edges and the vertical skeleton of the foreground regions in the area bordered by $x_{j-1}, x_j$ are extracted. After the extraction of the skeletons of the foreground regions, the $y_0$ parameter of the ellipse is iteratively computed.

Figure 12:
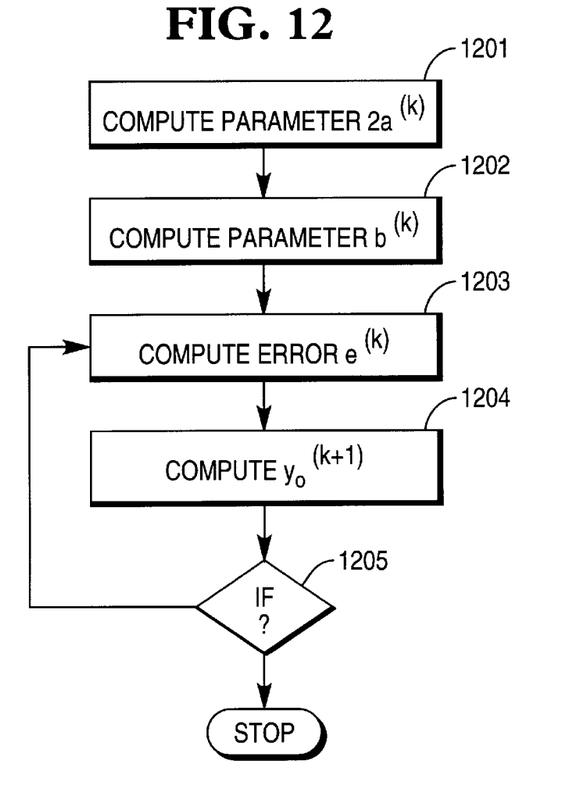

In one embodiment, the initial y coordinate of the ellipse centroid, $y_0^{(0)}$ is chosen close enough to the top of the object on the vertical skeleton in order for the algorithm to perform well for all types of sequences from head-and-shoulder to full-body sequence (step 504). Typically the initial value of $y_0^{(0)}$ is selected according to the following expression:

$$y_0^{(0)} = y_t + 0.1 \cdot (y_t - y_b) \qquad (11)$$

where $y_t$ is the y coordinate of the highest point of the skeleton and $y_b$ is the y coordinate of the lowest point of the skeleton. Given the initial point $y_0^{(0)}$, the ellipse fitting algorithm iterates through the following loop to estimate the ellipse parameters. The reference numerals in [brackets] refer to the steps illustrated in FIG. 12.

[1201] compute parameter $2a^{(k)}$ by measuring the distance between the left and the right edges of the blob.

[1202] compute parameter $b^{(k)}$ by measuring the y distance between $y_0^{(k)}$ and the highest point of the skeleton.

[1203] compute the error e(k) (in step 505), $$e(k) = b^{(k)} - Ma^{(k)}. \qquad (12)$$

In sum, the goal of the ellipse fitting algorithm described herein is to minimize this value, i.e. to find the ellipse that best satisfies the condition b=Ma, M=1.4.

[1204] compute the new value $y_0^{(k+1)}$ (step 506) using a linear estimate given by the following equation:

$$y_0^{(k+1)} = y_0^{(k)} + \mu e(k) \quad (12A)$$

[1205] if the distance between two consecutive centroids is smaller than a threshold, stop the iterations. When the iterations stop, $x_0, y_0, a$ and $b$ describe the four parameters of the ellipse. Otherwise, go to step 1203.

The above iterations converge to the ellipse parameters for an ellipse type contour. From equation (1), the distance between the right most and left most point of the ellipse corresponding to $y_0^{(k)}$ is determined by:

$$a^{(k)} = 2a\sqrt{1 - ((y_0^{(k)} - y_0)/Ma)^2} \quad (13)$$

and the distance between the top of the ellipse and $y_0^{(k)}$ is determined by $$b^{(k)} = y_0 + Ma - y_0^{(k)} \quad (14)$$

Hence, for $\mu = 1$, equation (1) becomes:

$$y_0^{(k+1)} - y_0 = Ma - Ma\sqrt{1 - ((y_0^{(k)} - y_0)/Ma)^2} \quad (15)$$

From the above equation it can be proved that $$|y_0^{(k+1)} - y_0|^2 < |y_0^{(k)} - y_0|^2 \quad (16)$$

for any $y_0^{(k)}$ for which $|y_0^{(k)} - y_0| < Ma$. This shows that the recurrence defined in equation (10) converges to $y_0$.

7. Eye Detection Process

The ellipses detected from stage 201, and as described previously, are potentially the region of support for human faces. After the detection of these regions, a more refined model for the face is required in order to determine which of the detected regions correspond to valid faces. The use of the eye detection process of stage 202, in conjunction with the head detection stage 201, improves the accuracy of the head model and removes regions corresponding to back views of faces or other regions that do not correspond to a face. Eye detection results can also be used to estimate the face pose and to determine the image containing the most frontal poses among a sequence of images. This result may then be used in recognition and classification systems.

The present invention may use an eye-detection algorithm based on both region size and geometrical measure filtering. The exclusive use of geometrical measures to detect the eyes inside a rectangular window around the ellipse centroid (eye band: W eye 1001 in FIG. 10) may lead to problems in the analysis of non-frontal faces. In these cases, the hair regions inside the eye band generate small hair regions that are not connected to each other and that are in general close in size and intensity to the eye regions. Under the assumption of varying poses, the simple inspection of geometrical distances between regions and positions inside the eye band cannot indicate which regions correspond to the eyes. Hence, a more difficult approach based on region shape can be taken into account. However, in the present invention, a simple method may be implemented to discriminate eye and hair regions that perform with good results for a large number of video image sequences. In this approach, the small hair regions inside the eye band are removed by analyzing the region sizes in a larger window around the upper portion of the face (W face-up 1002 in FIG. 10). Inside this window, the hair corresponds to the region of large size.

Figure 7A:
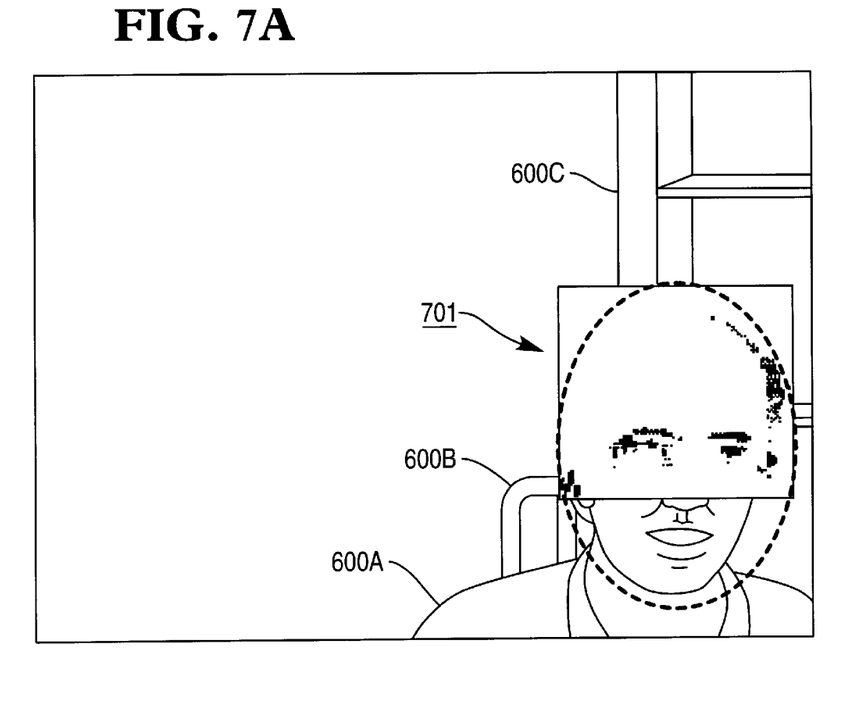

Stage 202 of FIG. 2 illustrates the steps of the eye detection approach that may be used according to the present invention. In step 221, the pixel intensities inside the face regions are compared to a threshold $\theta$, and pixels with intensities lower than $\theta$ are extracted from the face region. In step 222, and as shown in FIG. 7A, the connectivity analysis of the extracted pixels generates connected sets of pixels (e.g., pixels 701), i.e. sets of pixels that are adjacent or touching. Each of these connected sets of pixels 701 describe a low intensity region of the face.

In step 223, the pixel regions 701 resulting from steps 221–222 are filtered with respect to the region size. Regions having a small number of pixels due to camera noise or shadows are removed. Large regions generally cannot represent eyes, but instead correspond in general to hair. The size of the regions selected at this stage is in the interval $[\theta_m, \theta_M]$ where $\theta_m$ is the minimum and $\theta_M$ is the maximum number of pixels allowed by our system to describe a valid eye region. Threshold values $\theta_m, \theta_M$ are determined based on the size of the ellipse that characterizes the head region (the ellipse being generated iteratively in step 215). The end result of step 223 is an image 702, such as that shown in FIG. 7B.

Figure 7B:
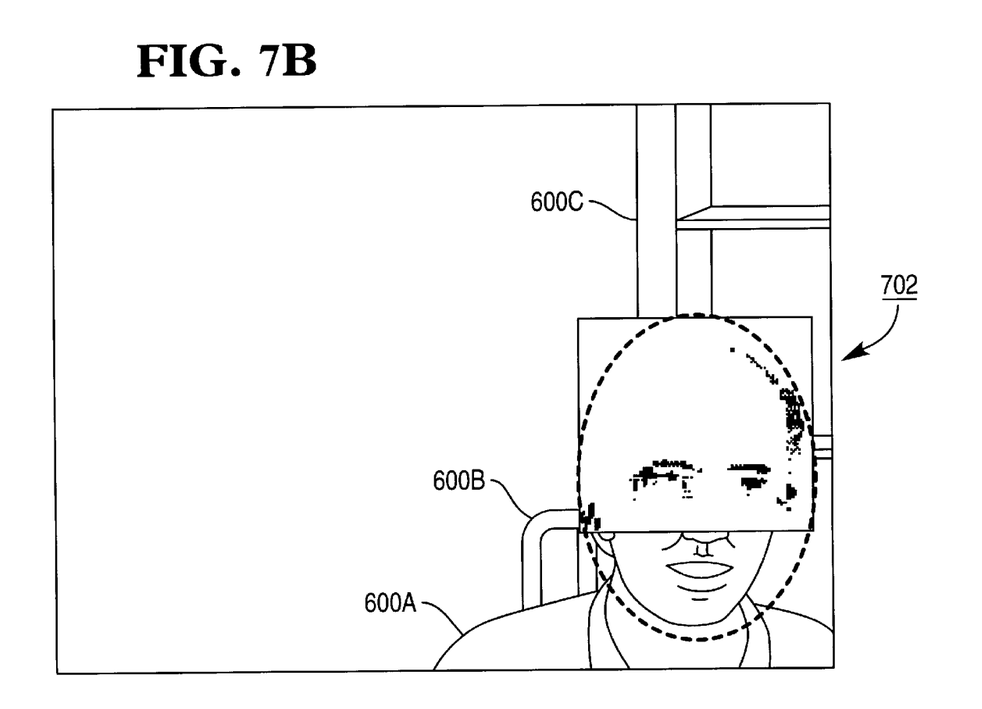
Figure 7C:
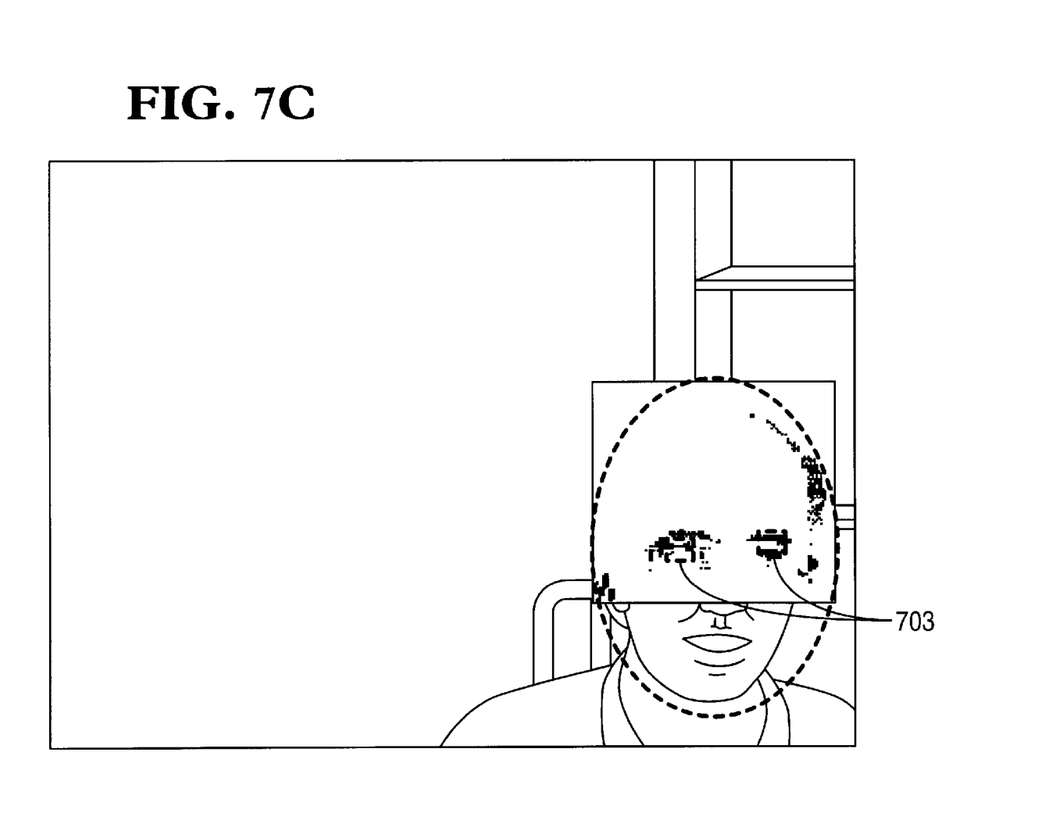

In step 224, the remaining components within the image of FIG. 7B are filtered based on anthropological measures, such as the geometrical distances between eyes and the expected position of the eyes inside a rectangular window (eye band) centered in the ellipse centroid. The eye regions are determined by analyzing the minimum and maximum distance between the regions inside this band. The output 230 of step 224 is an image, such as shown in FIG. 7C, whereby the eyes 703 have been detected.

Figure 8A:
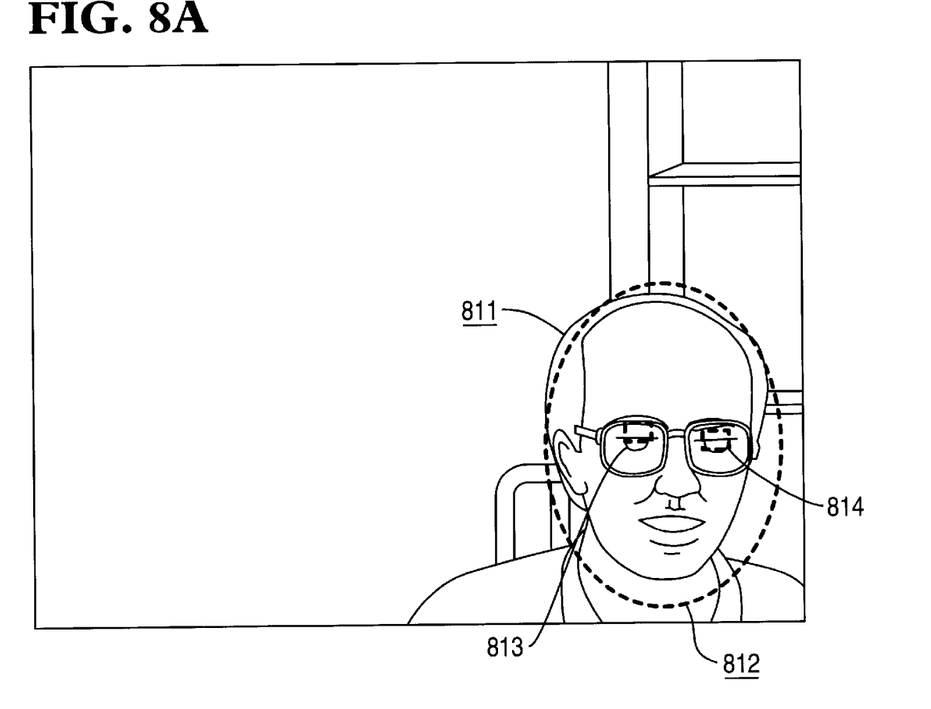

The present invention may be implemented on a variety of different video sequences from camera 110. FIGS. 8A, 8B, 8C and 8D depict the results obtained by operating the present invention in a sample laboratory environment, based upon the teachings above. FIGS. 8A–8D comprise four different scenarios generated to demonstrate the performances under different conditions such as non-frontal poses, multiple occluding people back views, and faces with glasses. In FIG. 8A, the face 812 of a single person 811 is detected, via ellipse 813. In this figure, the ellipse 813 is properly fitted around the face 812 and the eyes 814 are detected even though the person 811 is wearing optical glasses on his face 812.

Figure 8B:
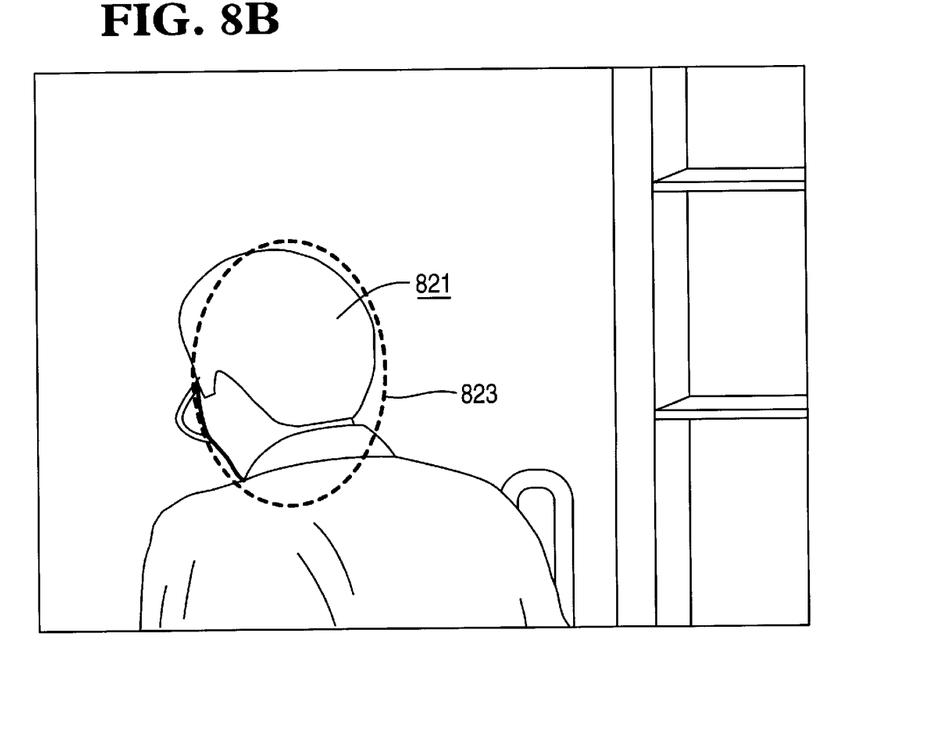

FIG. 8B shows the back view of a single person 821 in the video scene. In this figure, the ellipse 823 is fitted around the head of the person 821, but no eye is detected, indicating the robustness of the eye detection stage 202 of the present invention.

Figure 8C:
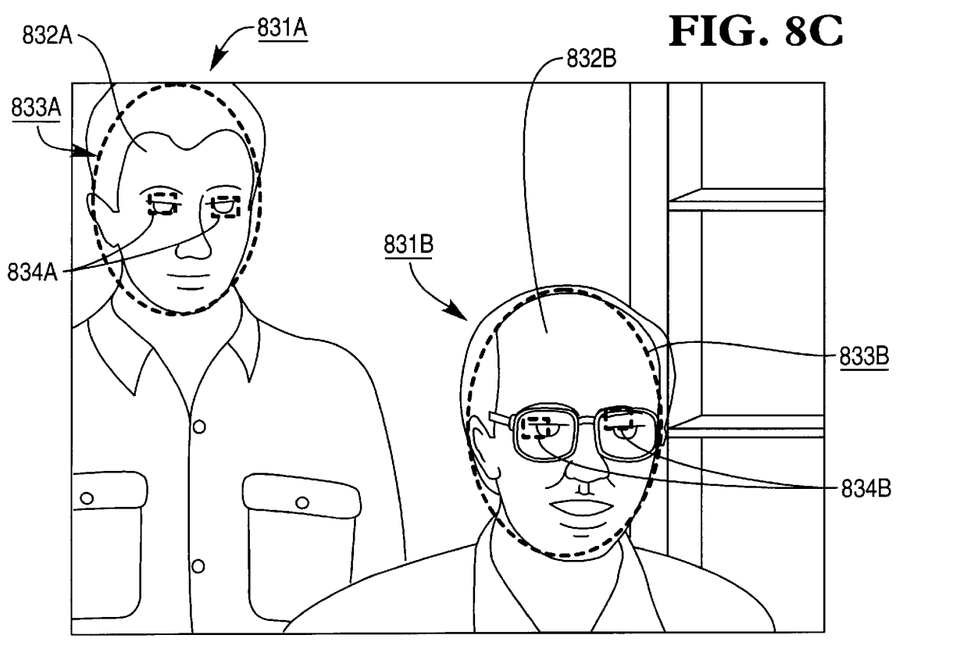
Figure 8D:
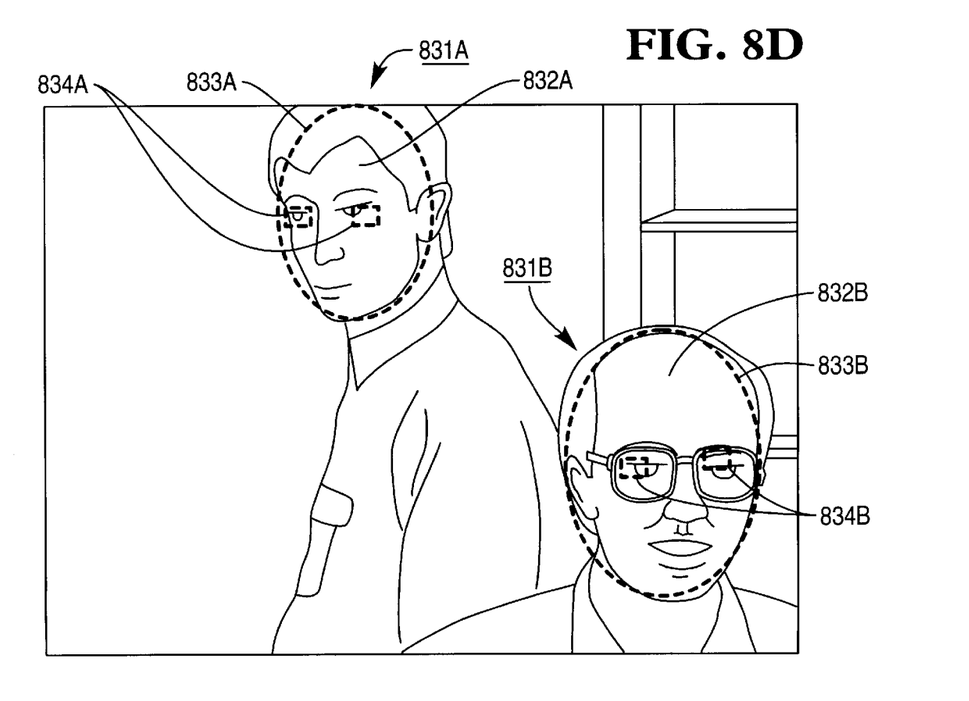

FIGS. 8C and 8D show two scenarios in which two people 831A and 831B are present in the scene. In both figures the body of one person 831B is covering part of the body of the other person 831A. In both cases, ellipses 833A and 833B are positioned around the faces 832A and 832B, and eyes 834A and 834B are detected. In FIG. 8D, the face 832A of the person 831A in the back has a non-frontal position. Also due to different distances from the camera 110, the size of the two faces 832A and 832B are different. The faces 832A and 832B of both persons 831A and 831B are detected indicating the robustness of the system to variations in parameters such as size and position of the faces 832A and 832B.

Although the present invention has been described with particular reference to certain preferred embodiments thereof, variations and modifications of the present invention can be effected within the spirit and scope of the following claims.

What is claimed is:

1. A system for detecting a face within a video image, comprising:
   (a) a video camera;
   (b) means for storing an image from the video camera; and
   (c) processing means coupled to the video camera and the storing means for performing the steps of:
      (i) storing a background image from the video camera in the storing means;
      (ii) storing a video image from the video camera in the storing means;
      (iii) subtracting the background image from video image stored in the storing means;
      (iv) identifying a region within the video image that surpasses a selected high intensity threshold;
      (v) comparing the identified region to at least one model of a face;
      (vi) selecting one of the at least one model that best describes the identified region;
      (vii) generating parameters associated with an ellipse that corresponds to the identified region, responsive to step (vi);
      (viii) identifying sub-regions within the identified region that are below a selected low-intensity threshold;
      (ix) filtering out sub-regions below a selected small size or above a selected large size;
      (x) comparing the remaining sub-regions to at least one anthropological model defining eyes; and
      (xi) generating parameters corresponding to the remaining sub-regions, responsive to step (x).

2. The system of claim 1, further comprising a second processing means for receiving the generated parameters and for performing further processing of the stored video image based upon the generated parameters.

3. The system of claim 1, further comprising a second processing means for receiving the generated parameters and for performing further processing of the stored video image based upon the generated parameters.

4. A process for detecting a face within a video image, wherein the video image is generated by a video camera and stored with a storage device, comprising the steps of:
   (a) storing a background image from the video camera in the storage device;
   (b) storing a video image from the video camera in the storage device;
   (c) subtracting the background image from video image stored in the storage device;
   (d) identifying a region within the video image that surpasses a selected high intensity threshold;
   (e) comparing the identified region to at least one model of a face;
   (f) selecting one of the at least one model that best describes the identified region; and
   (g) generating parameters associated with an ellipse that corresponds to the identified region, responsive to step (f);
   (h) identifying sub-regions within the identified region that are below a selected low-intensity threshold;
   (i) filtering out sub-regions below a selected small size or above a selected large size;
   (j) comparing the remaining sub-regions to at least one anthropological model defining eyes; and
   (k) generating parameters corresponding to the remaining sub-regions, responsive to step (j).

5. The process of claim 4, further comprising the step of performing further processing of the stored video image based upon the generated parameters.

6. The process of claim 4, further comprising the step of performing further processing of the stored video image based upon the generated parameters.

7. The system of claim 1, wherein the processing means further performs the steps of:
   (1) computing the vertical skeleton of the video image;
   (2) estimating an initial ellipse centroid from the highest and lowest point of the vertical skeleton;
   (3) measuring the width between the left and the right edges of the video image;
   (4) measuring the length between the highest point of the vertical skeleton and the y coordinate of the ellipse centroid at the current iteration;
   (5) computing the error $e^{(k)}$ associated with the currently determined ellipse parameters according to the expression:

$$e^{(k)} = b^{(k)} - Ma^{(k)}$$

wherein $b^{(k)}$ is the distance between the highest point of the vertical skeleton and the y coordinate of the ellipse centroid at the $k^{th}$ iteration, $a^{(k)}$ is the ellipse width at the current $k^{th}$ iteration, and M is the desired ratio of ellipse length to width.
   (6) computing a new centroid value according to the error associated with the ellipse parameters; and
   (7) repeating steps (1)–(6) until the distance between the new centroid and the centroid of the previous iteration is smaller than a selected threshold.

8. The process of claim 4, further comprising the steps of:
   (1) computing the vertical skeleton of the video image;
   (2) estimating an initial ellipse centroid from the highest and lowest point of the vertical skeleton;
   (3) measuring the width between the left and the right edges of the video image;
   (4) measuring the length between the highest point of the vertical skeleton and the y coordinate of the ellipse centroid at the current iteration;
   (5) computing the error $e^{(k)}$ associated with the currently determined ellipse parameters according to the expression:

$$e^{(k)} = b^{(k)} - Ma^{(k)}$$

wherein $b^{(k)}$ is distance the between the highest point of the vertical skeleton and the y coordinate of the ellipse centroid at the $k^{th}$ iteration, $a^{(k)}$ is the ellipse width at the current $k^{th}$ iteration, and M is the desired ratio of ellipse length to width;
   (6) computing a new centroid value according to the error associated with the ellipse parameters; and
   (7) repeating steps (1)–(6) until the distance between the new centroid and the centroid of the previous iteration is smaller than a selected threshold.

* * * * *